US008989753B2

(12) United States Patent
Aunkofer et al.

(10) Patent No.: US 8,989,753 B2
(45) Date of Patent: Mar. 24, 2015

(54) METHOD FOR ALLOCATING TRANSMISSION SIGNALS TO TRANSMISSION CHANNELS

(75) Inventors: Markus Aunkofer, Abensberg (DE); Thomas Georgi, Painten (DE); Christian Kursawe, Straubing (DE); Martin Opitz, Regensburg (DE); Thomas Reisinger, Regenstauf (DE)

(73) Assignee: Continental Automotive GmbH, Hannover (DE)

( * ) Notice: Subject to any disclaimer, the term of this patent is extended or adjusted under 35 U.S.C. 154(b) by 519 days.

(21) Appl. No.: 13/386,630

(22) PCT Filed: Jul. 15, 2010

(86) PCT No.: PCT/EP2010/060193
§ 371 (c)(1),
(2), (4) Date: Jan. 23, 2012

(87) PCT Pub. No.: WO2011/009795
PCT Pub. Date: Jan. 27, 2011

(65) Prior Publication Data
US 2012/0122401 A1    May 17, 2012

(30) Foreign Application Priority Data
Jul. 22, 2009   (DE) .......................... 10 2009 034 207

(51) Int. Cl.
*H04W 72/00*   (2009.01)
*H04W 52/02*   (2009.01)

(52) U.S. Cl.
CPC ............ *H04W 52/0229* (2013.01); *Y02B 60/50* (2013.01)
USPC .... 455/450; 455/63.1; 455/67.13; 455/452.1; 455/509

(58) Field of Classification Search
CPC .................... H04W 52/0229; H04W 52/0238; B60R 25/24
USPC .................. 455/63.1, 67.13, 450–452.1, 509; 340/5.72
See application file for complete search history.

(56) References Cited

U.S. PATENT DOCUMENTS 5,710,797 A     1/1998  Segal et al. .................... 375/346
5,974,138 A  * 10/1999  Sambhwani et al. .... 379/373.01

(Continued)

FOREIGN PATENT DOCUMENTS

| WO | 96/37981 A1 | 11/1996 | ............... H04J 1/12 |
| WO | 03/063538 A1 | 7/2003 | ............... H04Q 7/38 |
| WO | 2007/103991 A2 | 9/2007 | |

OTHER PUBLICATIONS

Nielsen, A.O. et al., "WCDMA Initial Cell Search", Vehicular Technology Conference, IEEE VTS Fall VTC 2000; XP010525192; pp. 377-383, Sep. 24, 2000.

(Continued)

*Primary Examiner* — Raymond Dean
(74) *Attorney, Agent, or Firm* — King & Spalding L.L.P.

(57) ABSTRACT

A method for allocating a transmission signal to a transmission channel which has a transmission bandwidth and a rated center frequency and which is established between a radio transmitter and a radio receiver has the steps: emitting the transmission signal on the radio transmitter end with an actual transmitter frequency; receiving the transmission signal in the radio receiver; determining the frequency of the transmission signal in the radio receiver; and deciding on the allocation of the transmission signal to a transmission channel if the frequency determined by the radio receiver lies in a predetermined frequency range.

16 Claims, 8 Drawing Sheets

(56) References Cited

U.S. PATENT DOCUMENTS

| | | | |
|---|---|---|---|
| 7,050,587 B1 | 5/2006 | Berberich | 380/262 |
| 2007/0103271 A1* | 5/2007 | King et al. | 340/5.72 |
| 2007/0211669 A1 | 9/2007 | Umatt et al. | 370/335 |
| 2008/0088411 A1 | 4/2008 | Ghabra et al. | 340/5.64 |
| 2009/0212906 A1* | 8/2009 | Michel et al. | 340/5.61 |

OTHER PUBLICATIONS

Ericsson, New UARFCN Scheme and Re-numbering, $3^{rd}$ Generation Partnership Project, Mobile Competence Centre, XP050175051; 6 pages, Nov. 11, 2005.

International PCT Search Report and Written Opinion, PCT/EP2010/060193, 27 pages, Jan. 31, 2011.

* cited by examiner

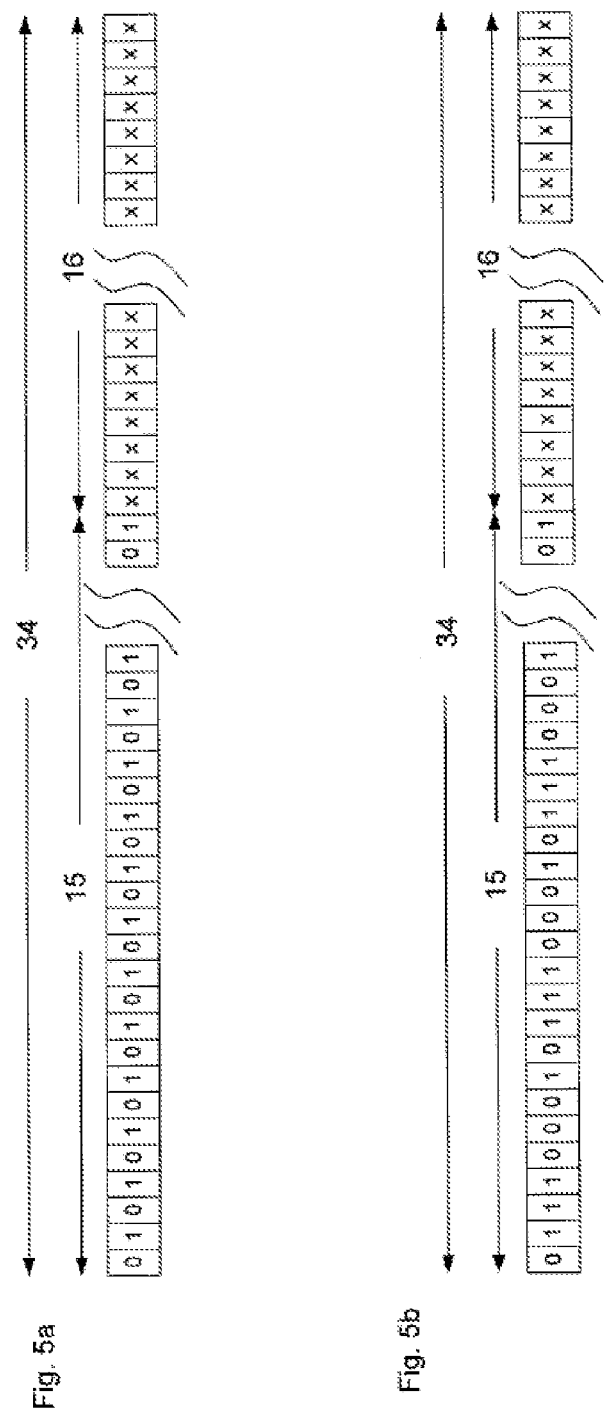

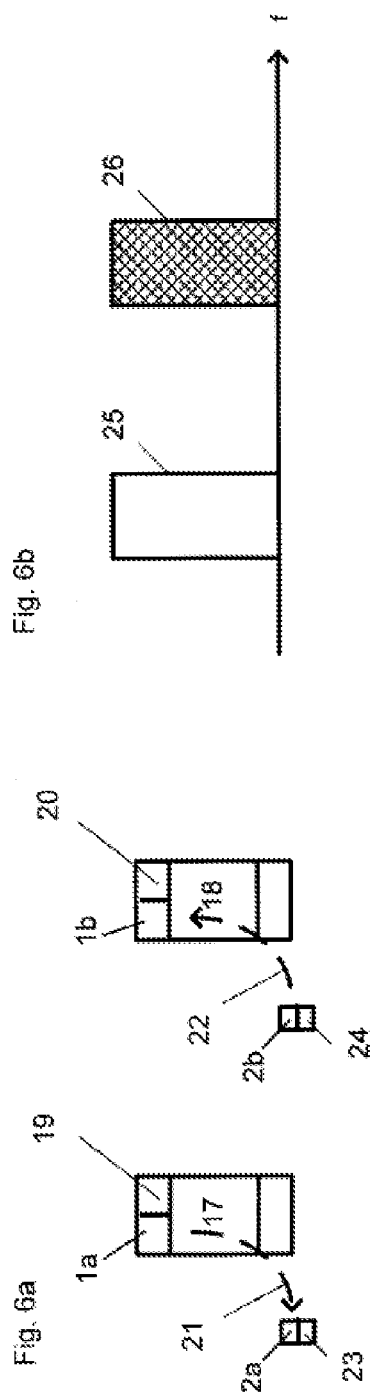

METHOD FOR ALLOCATING TRANSMISSION SIGNALS TO TRANSMISSION CHANNELS

CROSS-REFERENCE TO RELATED APPLICATIONS

This application is a U.S. National Stage Application of International Application No. PCT/EP2010/060193 filed Jul. 15, 2010, which designates the United States of America, and claims priority to German Application No. 10 2009 034 207.9 filed Jul. 22, 2009, the contents of which are hereby incorporated by reference in their entirety.

TECHNICAL FIELD

The invention relates to methods and systems for allocating transmission signals to transmission channels of a radio transmission system, in which the transmission bandwidths of the transmission channels can overlap.

BACKGROUND

In a large number of vehicles, in particular motor vehicles, nowadays a large number of functions are triggered or controlled by means of mobile radio transmitters which are carried by users on their person. Such a radio transmitter can also have a reception part for radio signals here, with the result that radio communication with a transceiver for radio signals, which is mounted in or on the vehicle, can also take place in a bidirectional fashion. During the radio communication between a radio transmitter, which may be, for example, a mobile identification signal generator for controlling functions of a vehicle, and a corresponding receiver which is arranged in or on a vehicle, large ranges are desired. This may apply, in particular, to comfort functions such as, for example, the activation of a stationary heating system from a relatively large distance. Furthermore, it is also possible to provide alarm functions in which, for example, a status of a vehicle is checked independently and cyclically and transmitted to the mobile identification signal generator (vehicle key). In this context, the authorization of the respective identification signal generator should also be verified.

Due to the large transmission and reception ranges of such a system it can be expected that a system may receive signals from other systems with, for example, the same method of functioning and/or similar channel parameters of the radio transmission, which may be disadvantageous. For example, this can lead to undesired effects or interference on the respective radio transmission. Furthermore, given such a high traffic density as occurs, for example, in built-up areas, a radio receiver in a vehicle can continuously receive signals which, despite the lack of authorization, have to be checked to determine whether they are associated with and authorized for the corresponding vehicle. As a result, for example the power consumption of such a radio receiver may be undesirably increased by up to a factor of 10.

SUMMARY

According to various embodiments, a method is provided for allocating transmission signals to transmission channels of a radio transmission system and for verifying said signals.

According to an embodiment, a method may be provided for allocating a transmission signal to a transmission channel having a transmission bandwidth and a nominal center frequency and which is established between a radio transmitter and a radio receiver The method may include emitting the transmission signal at the radio transmitter with an actual transmission frequency; receiving the transmission signal in the radio receiver; determining the frequency of the transmission signal in the radio receiver; and deciding on the allocation of the transmission signal to the one transmission channel if the frequency which is determined by the radio receiver is in a predefined frequency range.

According to a further embodiment, the predefined frequency range may depend on the transmission bandwidth and the nominal center frequency of the one transmission channel. The radio transmitter may have a first tolerance of its actual transmission frequency with respect to the nominal center frequency of the transmission channel, and the radio receiver has a second tolerance with respect to the nominal center frequency of the transmission channel, wherein the predefined frequency range depends on the maximum values of the two tolerances. According to a further embodiment, the allocation of the transmission signal to the transmission channel may take place when a passage difference between the radio transmitter and the radio receiver is not greater than the sum of the maximum permissible tolerance of the radio transmitter and of the maximum permissible tolerance of the radio receiver.

According to a further embodiment, a plurality of radio transmitters which transmit transmission signals and radio receivers which receive transmission signals may be provided, between which there are transmission channels each having a transmission bandwidth and a nominal center frequency, wherein the channel spacings which are related to the respective center frequencies are such that the transmission channels overlap. According to a further embodiment, the nominal center frequencies of the transmission channels of two radio receivers which are adjacent with respect to the center frequencies, and their associated radio transmitters may be spaced apart in such a way that the distance is at least the larger of two channel separation values, wherein one channel separation value for one radio receiver in each case may correspond precisely to the sum of the respective maximum permissible tolerances of the frequencies of the transmission signals which are allocated to the two adjacent radio transmitters and of twice the maximum permissible tolerance of the center frequency of the respective radio receiver. According to a further embodiment, the predefined transmission bandwidth and/or channel spacings may be equal for all the transmission channels.

According to a further embodiment, the distance between the nominal center frequencies of the transmission channels of two radio receivers which are adjacent with respect to the center frequencies may be selected such that said distance corresponds precisely to the sum of the respective maximum permissible tolerances of the frequencies of the transmission signals which are allocated to the two adjacent radio transmitters and of twice the maximum permissible tolerance of the center frequency of the respective radio receiver. According to a further embodiment, the radio transmitter and the radio receiver may be part of an access monitoring and/or control system of a vehicle, wherein the radio transmitter is a mobile identification signal generator and the radio receiver is a quasi-fixed radio receiver which is mounted in or on the vehicle and has the purpose of verifying the identification signal generator, and wherein functions of the access monitoring and/or control system are triggered by a verified identification signal generator. According to a further embodiment, the radio transmitter may transmit a data packet which has a wake-up preamble in a first part and an unambiguous identification code in a second part, wherein when the vehicle is not operating, the radio receiver is in a power-saving state of rest and is activated cyclically in order to receive signals, and during the reception of a wake-up preamble, the radio receiver determines the current frequency of the transmission signal, wherein after reception of the wake-up preamble and determination of the frequency of the transmission signal the radio receiver does not return to the power-saving state of rest, and subsequently check the identification code in the second part of the data packet if the current frequency of the transmission signal specifies a transmission signal which is associated with the channel of the radio receiver. According to a further embodiment, the wake-up preamble has an unambiguously encoded signal component which is compared with a predefined unambiguous pattern by the radio receiver.

According to a further embodiment, the radio receiver may evaluate the reception field strength and/or the modulation parameters and/or the data rate of the wake-up preamble and/or the line coding in order to verify the unambiguous allocation of a transmission signal, received from the radio receiver, to this radio receiver during the reception of the wake-up preamble. According to a further embodiment, a bidirectional radio communication may be provided in the access monitoring and/or control and/or information system. According to a further embodiment, bidirectional radio communication may take place in such a way that on the forward path and the return path of the radio communication are implemented by means of different transmission channels. According to a further embodiment, the predefined frequency range may depend on the channel spacing.

BRIEF DESCRIPTION OF THE DRAWINGS

Example embodiments will be explained in more detail below with reference to figures, in which:

FIG. 5a is a diagram showing a conventional wake-up preamble (WUP);

FIG. 5b is a diagram showing a wake-up preamble (WUP) which has encoded information;

FIGS. 6a-6b show an example of radio communication in which different channels are used for the forward path and return path of the radio communication;

DETAILED DESCRIPTION

Figure 1:
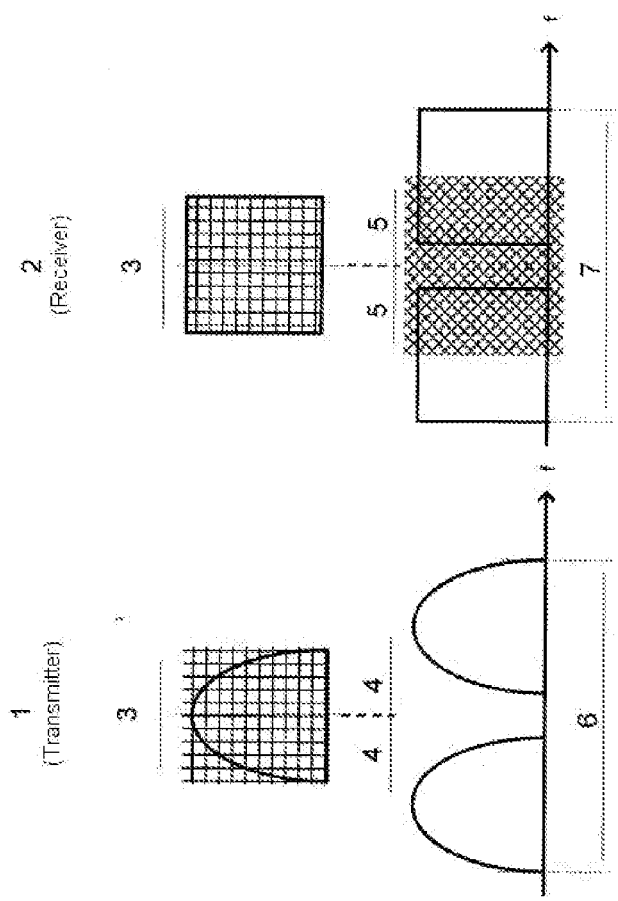
FIG. 1 is a diagram showing by way of example the frequency tolerances of the transmission and reception characteristics of a radio channel.

As already mentioned, long ranges are desired for radio communication between a mobile identification signal generator for controlling functions of a vehicle and a corresponding receiver which is arranged in or on a vehicle, wherein alarm functions in which a vehicle status is checked and transmitted to the mobile identification signal generator (vehicle key) are also included. In such a context, the authorization of the respective identification signal generator for the radio receiver and therefore the corresponding vehicle must also be verified in every case.

Owing to the necessary long transmission and reception ranges of the radio communication it is to be expected that a system also receives signals from other systems which have identical or similar functionalities and therefore have identical or similar channel parameters for the radio communication. This may lead to undesired effects or interference on the radio communication. A first example of this is interference of a receiver by the signals of other systems. Interference may be so strong in such a case that the desired communication between a specific radio transmitter and a specific radio receiver fails.

An example of undesired interference on a radio channel by signals of another adjacent system which is located in the range of the receiver is actual blocking by the signals of the adjacent system. In such a case, the signals of the adjacent system are received and firstly accepted as valid (because, for example, the transmission frequency matches the radio channel used) and processed. In such a context, it is only during the processing of the transmission signal (during the verification of an unambiguous code in the transmission signal, for example) that it is detected that this signal is not valid for the corresponding receiver.

This may lead to an increased utility factor of a vehicle-side receiver and therefore, for example, also to an undesirably increased power demand. In addition, this blocking also results in the increased risk of a radio telegram of the actually allocated system being missed or not being detected. The telegram structure applied according to certain conventional systems provides a signal with two components here. What is referred to as a wake-up preamble (WUP) is therefore transmitted before the actual data packet (frame) which carries the information in a radio telegram. The vehicle-mounted receiver in a vehicle which is not being operated and which is, for example, parked, is in what is referred to as the state of rest or "polling mode" in which said receiver is activated cyclically and checks received signals for wake-up criteria, such as, for example, reception field strength, modulation parameters or simple bit patterns.

Various systems generally use identical or similar WUP structures here. Therefore, even in the case of signals of an adjacent system a receiver must firstly assume that there is a valid signal and it cannot return immediately to the state of rest. Only the checking (verification) of an unambiguous code makes it possible to check which system a transmission signal or the emitting radio transmitter is actually associated with and whether said signal or transmitter is authorized. However, according to conventional techniques this unambiguous code is arranged in the data packet of the signal, that is to say after the WUP in terms of timing.

Considering typical transmission times of radio telegrams makes the extent of additionally occurring active operating states of a receiver clear. A WUP usually has a length of approximately 150 ms, and the frame (the data packet) usually has a length of approximately 100 ms. This means that the receiver has to remain on reception for up to 250 ms until it can be detected that the signal does not belong to the system in question. The existence of a large number of spatially adjacent systems leads accordingly to an increase in the activity of the receiver and therefore to an increased power demand.

Furthermore, as stated, there is an increased risk that the receiver will miss telegrams of the system in question because, during the reception (of checking) of the signal of an adjacent system, it is not possible to react to signals of the system in question. The subsequent exemplary calculation for a German built-up area clarifies the above-mentioned problem. While the population of Germany is 82.244 million, the number of registered vehicles is 48.1 million (as at 2007). The statistical number of vehicles per inhabitant is therefore 0.58. In a city such as Munich with 1.294 million inhabitants, this results in 647,000 vehicles in the municipal area. Assuming that 10% of the vehicles are equipped with radio communication systems such as those described above and are active, there are therefore 64,700 such systems in the municipal area of Munich. Given a size of the municipal area of 310 km², this leads statistically to 209 radio communication systems per km².

If a density of 200 systems per km² and a system range of, on average, 1 km is then assumed, 628 such systems can influence one another. This results in a number of several hundred or even thousand transmitted or received WUPs per hour given customary user profiles or for certain scenarios (a parking garage). Given 100 WUPs/h, an increase in the power consumption of a receiver of approximately 10% is to be expected. Given 500 WUPs per hour, this increase in power consumption is approximately 40%, and given 1000 WUPs per hour an increase in the power consumption of approximately 80% is to be expected. Given approximately 10,000 WUPs per hour, a receiver will receive the signal of another system at any time. A polling mode is therefore no longer possible and the power consumption is increased approximately by the factor of 10. Furthermore, interference with the communication is very probable.

Certain previous approaches to a solution to this problem comprise, for example, one or more of the following measures:

- Allocation of different channels (frequency diversity) for various vehicles or groups of vehicles. The disadvantage here is that a good channel selection is necessary, which limits the number of channels.
- Repetition of the radio telegram—cyclically or only in the event of a fault. The disadvantages here are relatively high power consumption in, for example, the mobile radio transmitter and therefore a shorter service life of the power supply (for example battery). In addition it is disadvantageous that although the system performance is improved in terms of interference, the situation in terms of receiver blocking is made worse.
- Reduction in the receiver bandwidth and consequently the channel bandwidth. It is disadvantageous that for certain functions relatively high data rates are advantageous (for example PASE, optimization of the quiescent current, reaction time) and therefore a sufficient reduction in the receiver bandwidth is not possible for all applications.

Both a transmitter and a receiver in a radio transmission system which cover a channel with a nominal frequency have a tolerance with regard to the actual transmission and reception frequencies. This is illustrated by way of example with respect to the definition of terms in FIG. 1. FIG. 1 shows a transmitter 1 and a receiver 2 as well as the bandwidth 3 which is respectively occupied by the transmitter 1 and the receiver 2 and which is allocated symmetrically about the nominal frequency of the channel. A customary transmitter such as the transmitter 1 has, with respect to its current frequency, certain, for example fabrication-conditioned or temperature-dependent frequency tolerances 4 in the negative and positive directions, which tolerances together define the entire tolerance range. The same applies to the receiver 2, which has frequency tolerances 5.

In the present example, these tolerances 4 and 5 are assumed to be symmetrical, that is to say to have the same deviations of the frequency in the positive and negative directions. Given an occupied bandwidth 3 of, for example, 20 kHz, these positive and negative frequency tolerances 4, 5 can be, for example, 5 kHz in the positive and negative directions, but they can also each respectively have different sizes for the transmitter and the receiver. Two extreme cases for the maximum deviations from the nominal frequency around which the occupied bandwidth 3 is respectively arranged can be derived therefrom. This leads finally to the entire bandwidth 6 of the transmitter 1 taking into account the above tolerances. In an analogous fashion, this applies to the bandwidth 7 of the receiver 2, as also illustrated in FIG. 1. Since the positive and negative transmitter and receiver tolerances 4, 5 are added together in the extreme cases, the minimum necessary transmission bandwidth of the receiver 2 is therefore calculated as $$2 \cdot F_{TS} + 2 \cdot F_{TE} + B_B$$

where $F_{TS}$ stands for the frequency tolerance 4 of the transmitter 1, $F_{TE2}$ stands for the frequency tolerance 5 of the receiver 2 and BB stands for the occupied bandwidth 3.

FIG. 2a illustrates the relationship between the frequency tolerances 4, 5 which are to be taken into account and the margin 8 which is to be additionally taken into account according to conventional techniques and which is necessary since the reception filter has a finite gradient (represented as a dashed line in FIG. 2a). The 3-dB cut-off frequencies of the reception filter, which is usually embodied as a bandpass filter, are usually used to determine the size of the receiver bandwidth 14. The sum of the transmitter tolerance 4, receiver tolerance 5 and the margin 8 with respect to the frequency is generally taken into account as what is referred to as a guard band 9 in the channel definition according to conventional techniques. The entire channel bandwidth 10 is therefore equal to the sum of the occupied bandwidth 3 and twice the guard band 9.

FIG. 2b shows a known arrangement of adjacent transmission channels n−1, n and n+1 each with a channel bandwidth which corresponds to the sum of the occupied bandwidth 3 and twice the guard band 9. The profile of the reception filter of the channel n is represented as a dashed line, wherein there is an adjacent channel suppression 11 with respect to the channel n+1.

In order to permit rapid and reliable allocation or differentiation (associated signal, non-associated signal) even at the start of reception of a radio telegram, according to certain embodiments the frequency tolerances of the transmitter and receiver may now be taken into account. The respective actual carrier frequency of the received transmission signal is measured in the receiver during the WUP reception. The measurement can be carried out, for example, using an AFC method (AFC=automatic frequency control) or by means of FFT demodulation (FFT=fast Fourier transformation). By using the previously defined (permissible) frequency error, a decision is made as to whether the received signal (radio telegram) can or cannot originate from an associated transmitter.

In this context, there must be no possibility of simultaneous, interference-free signal transmission in adjacent channels. This means that even channel spacings which result in a frequency overlap not only of directly adjacent channels but also of further indirectly adjacent channels with respect to the directly adjacent channels of adjacent channels.

Figure 3:
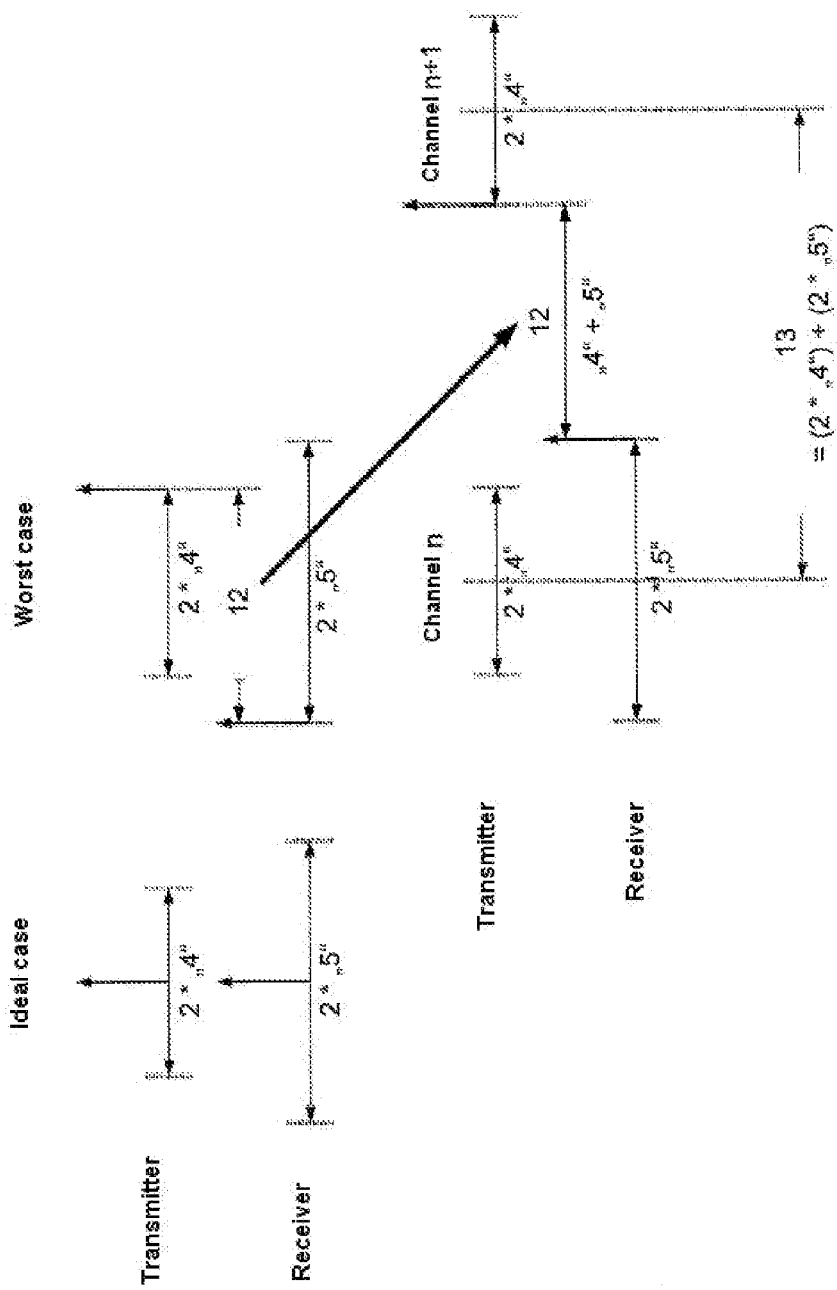
FIG. 3 is a diagram showing the minimum possible channel spacing according to the method according to certain embodiments.

FIG. 3 shows the derivation of the minimum possible channel spacing 13 with a method according to certain embodiments for simultaneous signal transmission in adjacent channels having equal bandwidths and tolerances, which signal transmission permits unambiguous channel allocation. For this purpose, the worst case is assumed in which the transmission signal and the center frequency have the maximum frequency deviations (tolerances) in different directions. In such a case, the maximum frequency tolerance 4 of a transmitter and the maximum frequency tolerance 5 of a receiver of the channel n with respect to the maximum frequency error 12 are added together.

Furthermore, allowance is made for the fact that an adjacent channel n+1 also has the worst case with respect to the allocation of a transmission signal to one of the channels n or n+1. This means that the center frequency of the adjacent channel n+1 is shifted in the direction of the channel n by the maximum possible value of the frequency tolerance 5. In the present example, it is assumed that adjacent channels of a radio system have equal bandwidths and equal symmetrical frequency tolerances, as is the case, for example, in a radio system for controlling functions of a vehicle.

On this basis, it is possible to determine the minimum possible channel spacing 13 (=KA) which is necessary to reliably allocate the frequency of a received transmission signal (radio telegram) to the associated channel. This minimum possible channel spacing 13 must meet the following condition here:

$$KA \geq 2 \cdot F_{TS} + 2 \cdot F_{TE}$$

Figure 2:
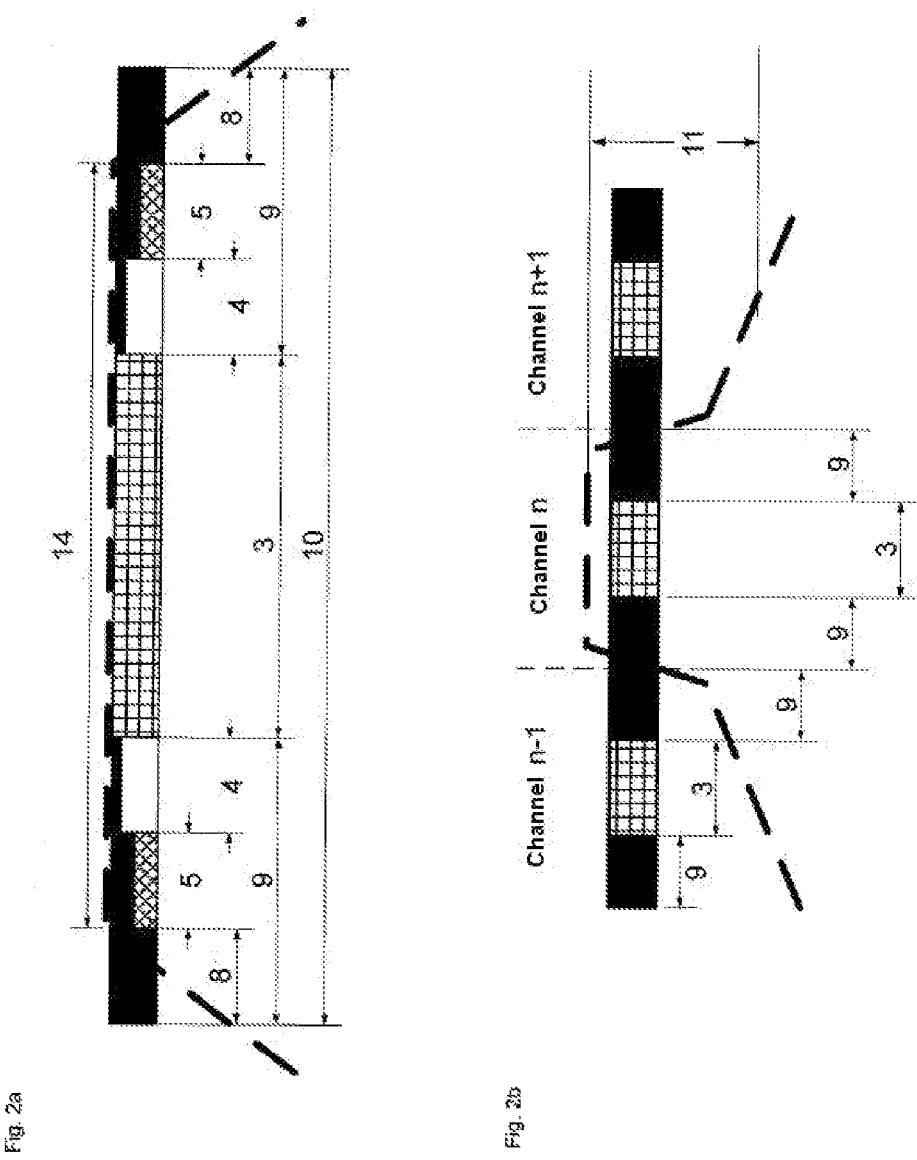
FIG. 2a is a diagram showing the guard band of a radio channel.
FIG. 2b is a diagram showing the definition of an adjacent channel, of adjacent channel suppression, of a common mode channel as well as the required selection curve of a radio channel according to conventional techniques.

In contrast, the necessary channel spacing according to conventional techniques is calculated according to FIG. 2 as:

$$KA = B_B + 2 \cdot S_D = B_B + 2 \cdot F_{TS} + 2 \cdot F_{TE} + 2 \cdot M,$$

where M is a margin 8 and SD is the guard band 9.

According to certain embodiments, the necessary channel spacing is therefore reduced by the value obtained from $B_B + 2 \cdot M$. In this way, the selection criterion "frequency error" or "frequency tolerance" permits reliable differentiation of the channels with which a transmission signal is associated. Under these conditions, the channels can be arranged more closely to one another on the frequency axis. With respect to the definition of the channel spacing according to conventional techniques, overlaps of adjacent channels are therefore also possible. The number of channels which are possible in a predefined frequency band is therefore increased.

This will be clarified below with reference to a comparative computational example. In this context, an available frequency band with a width of 300 kHz is assumed. The occupied bandwidth of the radio channels is 20 kHz both in conventional techniques and in the method according to certain embodiments, and the frequency tolerances of the transmitters and of the receivers are assumed to be +/−5 kHz.

Taking these values as a basis, the minimum guard band for transmission channels which are arranged adjacently in a frequency band according to conventional techniques (frequency diversity) is calculated as $$S_{Dmin} = 0.125 \cdot B_B + 1.25 \cdot F_{TS} + 1.25 \cdot F_{TE} = 2.5 \text{ kHz} + 6.25 \text{ kHz} + 6.25 \text{ kHz} = 15 \text{ kHz}.$$

The receiver bandwidth 14 (see FIG. 2a) is calculated as $$B_B + 2 \cdot F_{TS} + 2 \cdot F_{TE} = 20 \text{ kHz} + 2 \cdot 10 \text{ kHz} = 40 \text{ kHz}.$$

The channel bandwidth 10 (see FIG. 2a) is calculated as $$KA_{min} = B_B 2 \cdot SD = 20 \text{ kHz} + 2 \cdot 15 \text{ kHz} = 50 \text{ kHz}.$$

This results in a minimum channel spacing $KA_{min}$ of 50 kHz and a number of 6 channels in the predefined frequency band of 300 kHz.

For the method according to certain embodiments, the receiver bandwidth 14 is likewise calculated as:

$$B_B + 2 \cdot F_{TS} + 2 \cdot F_{TE} = 20 \text{ kHz} + 2 \cdot 10 \text{ kHz} = 40 \text{ kHz}.$$

The minimum channel spacing is however calculated as $$2 \cdot F_{TS} + 2 \cdot F_{TE} = 2 \cdot 5 \text{ kHz} + 2 \cdot 5 \text{ kHz} = 20 \text{ kHz}.$$

This means that channels which are adjacent at the frequency can overlap with respect to their receiver bandwidth 14 by up to 20 kHz (see for example FIG. 7b and FIG. 7c) and at the same time, according to certain embodiments of the method, reliable allocation of transmission signals to transmission channels can still be achieved. For this reason, a maximum total of $N_K=14$ adjacent channels can then be arranged in the available frequency band with a width of 300 kHz, where $F_{VB}$ stands for the available frequency band:

$$N_K = (F_{VB} i - B_B + 2 \cdot F_{TS} + 2 \cdot F_{TE})/KA_{min} - 1 = (300 \text{ kHz} - 20 \text{ kHz} + 2 \cdot 10 \text{ kHz})/20 \text{ kHz} - 1 = 14.$$

In certain embodiments of the method which is presented it is also advantageous that the determination of the frequency of the transmission signal and the allocation to a transmission channel can already be carried out during the reception of the wake-up preamble of the radio telegram. The radio telegram (data packet) has here the wake-up preamble (WUP) in a first part and an unambiguous identification code in a second part. The radio receiver is usually in a power-saving state of rest and is activated cyclically in order to receive any signals.

In this context, in certain embodiments of the method, the receiver of the radio telegram does not return after the reception of the wake-up preamble and determination of the frequency of the transmission signal to a power-saving state of rest and subsequently verify the identification code in the second part of the data packet only if the current frequency of the transmission signal indicates a transmission signal which is associated with the channel of the radio receiver. This ensures that the active operation of the receiver is reduced for each radio telegram which is received and not assigned to the latter, with the result that a corresponding power saving can be achieved during the operation of the receiver.

The change in the probability of interference and blocking when the method of certain embodiments is applied to the channel overlap will be considered below. The distance between the center frequencies of two adjacent channels in the conventional channel grid according to conventional techniques will be referred to as $\Delta f^{CS}$, and the distance in the channel grid according to certain embodiments using the channel overlap is referred to as $\Delta f^{CO}$. The receiver bandwidth is equal to $\Delta f^{CS}$. The $B_{ges}$ is the entire available transmission bandwidth which can also comprise a plurality of channels. $N^{CS}_{channel}$ and $N^{CO}_{channel}$ are the number of users (transmission systems) per channel with the conventional channel grid and with the channel grid with channel overlap. The change in the probability of blocking or interference with the conventional channel grid (CS) or with the channel grid with channel overlap (CO) can be summarized with the following expressions:

$$\frac{P_{Block}^{CO}}{P_{Block}^{CS}} = \frac{\frac{\Delta f^{CO}}{\Delta f^{CS}} \cdot \left(\frac{1}{1 + \frac{\Delta f^{CS}}{B_{ges}}\left(\frac{\Delta f^{CO}}{\Delta f^{CS}} - 1\right)}\right) - \frac{1}{N_{Channel}^{CS}}}{1 - \frac{1}{N_{Channel}^{CS}}}$$

and $$\frac{P_{Interf}^{CO}}{P_{Interf}^{CS}} = \frac{\left(\frac{1}{1 + \frac{\Delta f^{CS}}{B_{ges}}\left(\frac{\Delta f^{CO}}{\Delta f^{CS}} - 1\right)}\right) - \frac{1}{N_{Channel}^{CS}}}{1 - \frac{1}{N_{Channel}^{CS}}}$$

Figure 4:
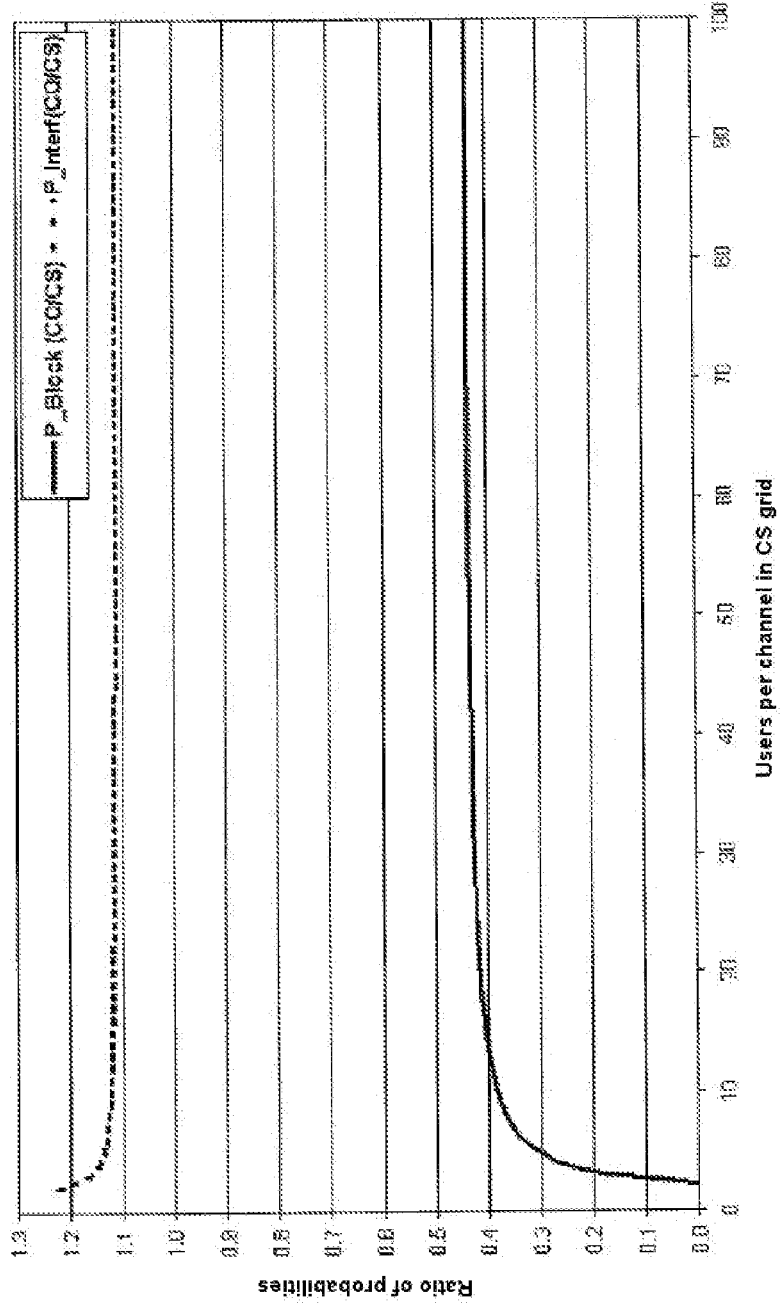
FIG. 4 is a diagram showing the change in the interference probability and blocking probability when the method is applied to channel overlap.

FIG. 4 shows the profiles for the ratios of:

$$\frac{P_{Block}^{CO}}{P_{Block}^{CS}}$$

and $$\frac{P_{Interf}^{CO}}{P_{Interf}^{CS}}$$

as a function of the number of users per channel in the conventional channel grid (CS). According to the example illustrated further above with 6 channels in the conventional channel grid (CS) and with 14 channels in the channel grid with channel overlap (CO) it is apparent that for many users the probability of blocking per conventional channel can be significantly reduced approximately according to the ratio $$\frac{\Delta f^{CO}}{\Delta f^{CS}}$$

while the probability of interference becomes only moderately worse. If it is also taken into account that in order to calculate the above curves the occupied bandwidth has been set equal to the receiver bandwidth and to the channel spacing in the conventional channel grid (CS), it becomes clear that the ratios shown can in reality behave even better since frequency ranges which are not used in the calculation have been considered as being used.

FIG. 5a shows the structure of a customary radio telegram such as is used according to conventional techniques in radio systems for controlling vehicle systems. The radio telegram 34 (data packet) is divided into a first part 15 and a second part 16. The first part 15 constitutes what is referred to as the wake-up preamble (WUP), and the second part represents what is referred to as the useful data, which may have, for example, a unique code for identifying and verifying the transmitter of the radio telegram. The vehicle-side receiver is located in a vehicle which is not operating, for example parked, in what is referred to as a state of rest or "polling mode" in which it is cyclically actuated and checks received signals for "wake-up" criteria such as, for example, reception field strength, modulation parameters or simple bit patterns. Various systems generally use identical or similar WUP structures here.

FIG. 5b shows the structure of a radio telegram with a WUP code according to certain embodiments. In this context, a simple pattern is inserted into the WUP 15 of a radio telegram 34, which pattern can be used to detect the association with a vehicle or with a vehicle group as soon as the WUP 15 is received.

In this way, as soon as WUP is detected, a rapid decision can be made as to whether a signal which is extraneous to the system is present or whether the received radio telegram 34 is associated with the receiver. The WUP detection can be implemented cost-effectively by, for example, a simple correlator.

A simple pattern (for example a restriction to 8 bits) is advantageous here since otherwise necessary time of the receiver in the active operating state (power consumption) for arriving at the decision increases. For this reason, various vehicles could also have the same WUP code. The objective is primarily to reduce the adjacent systems which are possible or present for blocking. Systems according to the present state of the art frequently use patterns within the WUP with simple level changes (for example: low-high-low-high) in order to permit simple and rapid detectability of the WUP. In contrast, certain embodiments use a specific code within the WUP.

According to certain embodiments, configuration possibilities of the method are that the radio receiver evaluates the reception field strength and/or the modulation parameters and/or the data rate of the wake-up preamble (WUP) and/or the line coding in order already to verify the unambiguous allocation of a transmission signal, received from the radio receiver, to this radio receiver during the reception of the wake-up preamble.

FIG. 6a shows an example embodiment of the method in which different channels are used for the forward path and return path 17, 18 of a bidirectional radio communication. For this purpose, radio transmitters 23, 24 (for example identification signal generators for a vehicle) also each have a radio receiver 1a or 1b, respectively, and radio receivers 19, 20 also each have a radio transmitter 2a or 2b, respectively. FIG. 6a shows two vehicles 17 and 18, respectively, each with a radio receiver 19 and 20, respectively, and a radio receiver 1a and 1b, respectively, as well as two mobile identification signal generators and respectively radio transmitters 23 and 24 which each also include radio receivers 2a and 2b. For what is referred to as the uplink 22, that is to say the radio link from the identification signal generator 23, 24 to the vehicle 17, 18, a different frequency channel is available than for what is referred to as the downlink 21, that is to say the radio link from the vehicle 17, 18 to the identification signal generator 23, 24.

In this way, the probability of interference in situations with a high vehicle density (for example on a large car park) can be reduced. Vehicles which transmit in the downlink do not disrupt the uplink of adjacent vehicles when this method is applied. If, for example, the vehicle 17 transmits an alarm, this leads to a frequent periodic emission of the downlink radio telegrams. A user would like to open the adjacent vehicle 18 in which he transmits an uplink radio telegram via the identification signal generator 24. When the same channel is used for uplink and downlink there would then be a high probability that the uplink telegrams for vehicle 18 would experience interference from the downlink telegrams of vehicle 17. This is avoided by the use of different frequency channels for the uplink and downlink. FIG. 5b shows by way of example the arrangement of the different channels over the frequency f for an uplink channel 25 and a downlink channel 26.

In a further embodiment, the possibility of overlapping adjacently arranged channels as described further above can be used to configure the largest possible number of channel allocations with particularly good selection properties. The objective is firstly to reduce the susceptibility to interference from interference signals using the configuration of a plurality of channels which are used in parallel with redundant signal transmission. The further apart the frequencies of the channels which are used in parallel and allocated to one another are, the greater the degree of achievable interference suppression through the parallel use of channels. In the following FIG. 7, for example in each case two channels which are used in parallel for redundant signal transmission are represented for the sake of better clarity, wherein more than two channels can also be used in order to improve the susceptibility to interference.

Figure 7A:
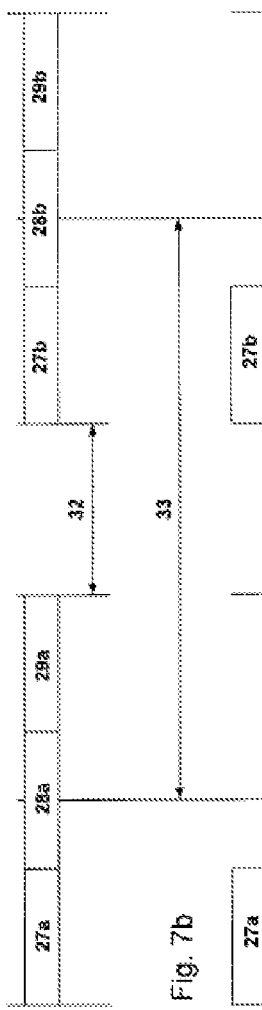
FIGS. 7a-7c show a diagram showing examples of the arrangement of paired radio channels for redundant signal transmission.

FIG. 7a illustrates by way of example 3 equidistant channel pairs 27a, 27b; 28a, 28b; and 29a, 29b which are arranged in a predefined frequency range and whose receiver bandwidths or channels do not overlap (e.g., according to conventional techniques). An unused frequency range 32 and a frequency spacing of channels 33 which are respectively allocated to one another results from the shown arrangement of the channel pairs 27a, 27b; 28a, 28b; and 29a, 29b.

Figure 7B:
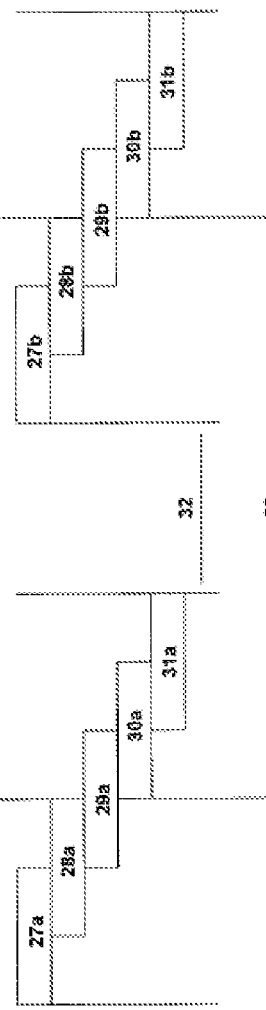
Figure 7C:
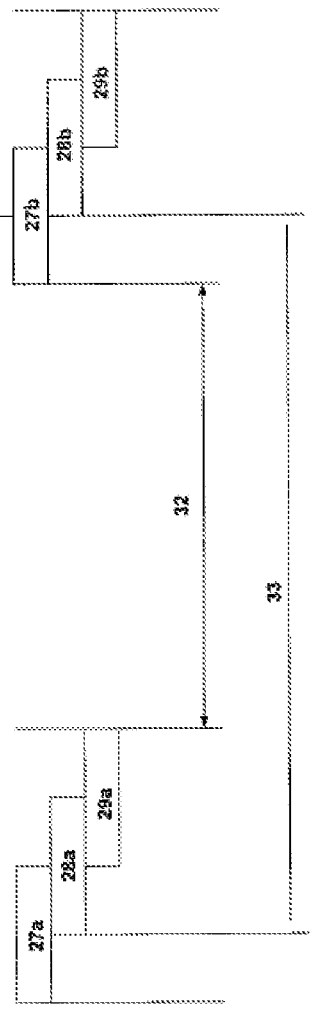

The channel overlap which is described further above can then be applied to increase the number of channel pairs in the predefined frequency range with constant selection properties (susceptibility to interference). An example of this is illustrated in FIG. 7b. In this context, the receiver bandwidths, frequency tolerances and minimum required channel spacings of the exemplary calculation given further above are applied so that the illustrated channels have a transmission bandwidth of 40 kHz and a channel overlap of 20 kHz. From FIG. 7b it is apparent that the number of three channel pairs accommodated in the predefined frequency band (see FIG. 7a) is increased to five (27a, 27b and 28a, 28b and 29a, 29b and 30a, 30b as well as 31a, 31b), wherein the size of the unused frequency range 32 and the frequency spacing 33 of channels which are respectively allocated to one another remains constant.

Furthermore, the channel overlap can be applied to increase the frequency spacing 33 of channels which are respectively allocated to one another in the predefined frequency range with a constant number of channel pairings (three). This leads to an improvement in the selection properties and to a reduction in the susceptibility of the redundant signal transmission to interference. An example of this can be seen in FIG. 7c. Here, the frequency spacing 33 of channels which are respectively allocated to one another is increased by 20 kHz.

Figure 8:
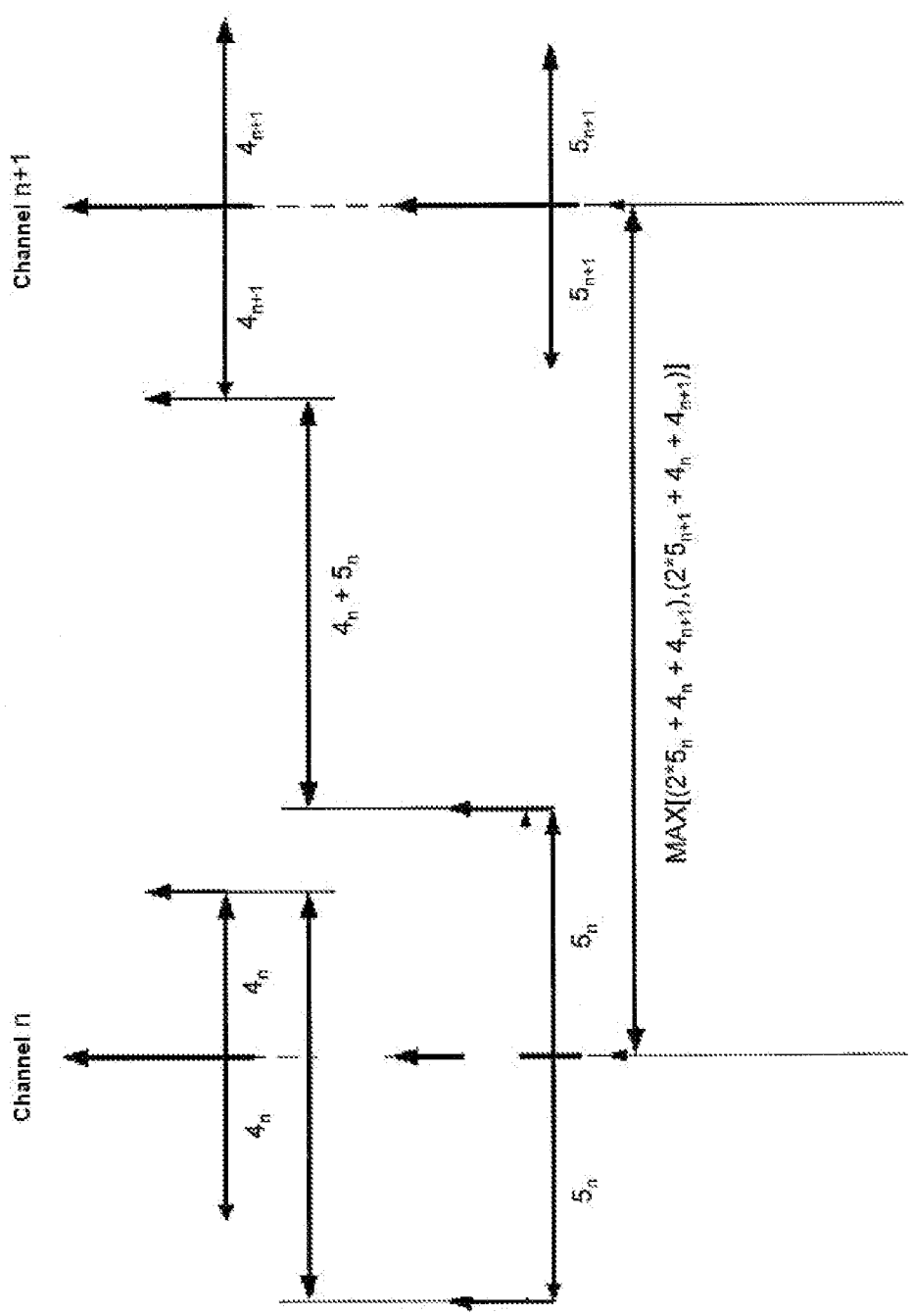
FIG. 8 is a diagram showing the minimum possible channel spacing according to certain embodiments of the method for adjacent channels with different frequency tolerances.

FIG. 8 shows additionally the derivation of the minimum possible channel spacing in a method according to various embodiments for a simultaneous signal transmission in adjacent channels n and n+1 which are to be unambiguously allocated and which have different tolerances $4_n$ and $4_{n+1}$ for the frequency of the transmission signal and different tolerances $5_n$ and $5_{n+1}$ for the center frequency of the transmission channel compared to FIG. 3. The minimum channel spacing is calculated here as MAX[$(2*5_n+4_n+4_{n+1})$, $(2*5_{n+1}+4_n+4_{n+1})$]. Consequently, the problem arises that on many transmission paths (radio transmitter/radio receiver) transmission occurs in a limited frequency range which does not permit appropriate division of a conventional channel grid. The radio receivers are therefore frequently woken up in order to carry out an identification procedure. According to certain embodiments, the transmission paths then operate at offset frequencies and the receivers test the transmission frequency before the identification procedure and carry this out only at a suitable frequency. The allocation of a transmission signal to a transmission channel provides here for the emission of the transmission signal by the radio transmitter within a transmission channel. The actual transmission frequency does deviate here from the nominal transmission frequency, i.e. the center frequency of the transmission channel owing to tolerances in the transmitter, wherein the maximum possible deviation is known. After the reception of the transmission signal by the radio receiver, the frequency of the transmission signal is determined within the radio receiver. Determination of the "current frequency" of a transmission signal is always only possible with the finite accuracy of the frequency normal or time normal within the measuring device. In the case of radio transmitters and radio receivers, the deviations from this normal are of the same order of magnitude. For this reason it is more appropriate to speak of the determination of a passage difference between the transmitter and receiver since a measuring error which is approximately of the same size in terms of absolute value occurs during the determination of the frequency error of the transmission signal.

Accordingly, the allocation of the transmission signal to the transmission channel which is being sought occurs if the specific frequency of the transmission signal does not exceed a threshold value. The frequency band corresponds here to a type of "threshold value" to the effect that a decision has to be made on the basis of a specific criterion and this criterion is the frequency location of the received signal with respect to the desired or permissible frequency range. When there are a plurality of transmitters and receivers and/or in the case of bidirectional communication, the transmission paths operate at offset frequencies, that is to say are divided into various channels. The transmission channels can then be spaced apart in such a way that their channel bandwidths overlap one another, specifically in a directly adjacent fashion and an indirectly adjacent fashion, that is also to say the neighbor of the neighbor. According to certain embodiments, channel spacings (for example half transmission channel bandwidth) which permit superimposition of frequency components of (directly and indirectly) adjacent channels are sufficient. The channel arrangement may therefore be advantageously defined in such a way that larger channel spacings than are necessary on the basis of the channel allocations are not selected and therefore as many channels as possible can be provided.

LIST OF REFERENCE NUMBERS

1 Transmitter
1a Transmitter
1b Transmitter
2 Receiver
2a Receiver
2b Receiver
3 Occupied bandwidth
4 Frequency tolerance
5 Frequency tolerance
6 Bandwidth
7 Bandwidth
8 Margin
9 Guard band
10 Channel bandwidth
11 Adjacent channel suppression
12 Frequency error
13 Channel spacing
14 Receiver bandwidth
15 First part of radio telegram
16 Second part of radio telegram
17 Vehicle
18 Vehicle
19 Transceiver
20 Transceiver 21 Downlink
22 Uplink
23 Identification signal generator
24 Identification signal generator
25 Uplink channel
26 Downlink channel
27a Channel
27b Channel
28a Channel
28b Channel
29a Channel
29b Channel
30a Channel
30b Channel
31a Channel
31b Channel
32 Frequency range
33 Frequency spacing
34 Radio telegram

The invention claimed is:

1. A method for allocating a transmission signal to a transmission channel having a transmission bandwidth and a nominal center frequency and which is established between a radio transmitter and a radio receiver, comprising:
emitting the transmission signal at the radio transmitter with an actual transmission frequency;
receiving the transmission signal in the radio receiver;
determining the frequency of the transmission signal in the radio receiver;
determining whether the frequency determined by the radio receiver is in a predefined frequency range;
wherein the radio transmitter has a first maximum tolerance of actual transmission frequency with respect to the nominal center frequency of the transmission channel, and the radio receiver has a second maximum tolerance with respect to the nominal center frequency of the transmission channel,
wherein the predefined frequency range depends on the transmission bandwidth of the transmission channel, the first maximum tolerance associated with the radio transmitter, and the second maximum tolerance associated with the radio receiver,
deciding on the allocation of the transmission signal to the one transmission channel if the frequency determined by the radio receiver is determined to be in the predefined frequency range, wherein the allocation of the transmission signal to the transmission channel takes place when a passage difference between the radio transmitter and the radio receiver is not greater than the sum of the first maximum tolerance associated with the radio transmitter and the second maximum tolerance associated with the radio receiver.

2. The method according to claim 1, wherein a plurality of radio transmitters which transmit transmission signals and radio receivers which receive transmission signals are provided, between which there are transmission channels each having a transmission bandwidth and a nominal center frequency, wherein the channel spacings which are related to the respective center frequencies are such that the transmission channels overlap.

3. The method according to claim 2, in which the nominal center frequencies of the transmission channels of two radio receivers which are adjacent with respect to the center frequencies, and their associated radio transmitters are spaced apart in such a way that the distance is at least the larger of two channel separation values, wherein one channel separation value for one radio receiver in each case corresponds precisely to the sum of the respective maximum permissible tolerances of the frequencies of the transmission signals which are allocated to the two adjacent radio transmitters and of twice the maximum permissible tolerance of the center frequency of the respective radio receiver.

4. The method according to claim 2, in which at least one of the predefined transmission bandwidth and channel spacings are equal for all the transmission channels.

5. The method according to claim 2, in which the distance between the nominal center frequencies of the transmission channels of two radio receivers which are adjacent with respect to the center frequencies is selected such that said distance corresponds precisely to the sum of the respective maximum permissible tolerances of the frequencies of the transmission signals which are allocated to the two adjacent radio transmitters and of twice the maximum permissible tolerance of the center frequency of the respective radio receiver.

6. The method according to claim 1, in which the radio transmitter and the radio receiver are part of an access monitoring/control system of a vehicle that provides at least one of access monitoring and control functions, wherein the radio transmitter is a mobile identification signal generator and the radio receiver is a quasi-fixed radio receiver which is mounted in or on the vehicle and has the purpose of verifying the identification signal generator, and wherein functions of the access monitoring/control system are triggered by a verified identification signal generator.

7. The method according to claim 6, wherein the radio transmitter transmits a data packet which has a wake-up preamble in a first part and an unambiguous identification code in a second part, wherein when the vehicle is not operating, the radio receiver is in a power-saving state of rest and is activated cyclically in order to receive signals, and
during the reception of a wake-up preamble, the radio receiver determines the current frequency of the transmission signal, wherein
after reception of the wake-up preamble and determination of the frequency of the transmission signal the radio receiver does not return to the power-saving state of rest and subsequently check the identification code in the second part of the data packet if the current frequency of the transmission signal specifies a transmission signal which is associated with the channel of the radio receiver.

8. The method according to claim 7, in which the wake-up preamble has an unambiguously encoded signal component which is compared with a predefined unambiguous pattern by the radio receiver.

9. The method according to claim 7, in which the radio receiver evaluates at least one of the reception field strength, the modulation parameters, the data rate of the wake-up preamble, and the line coding in order to verify the unambiguous allocation of a transmission signal, received from the radio receiver, to this radio receiver during the reception of the wake-up preamble.

10. The method according to claim 6, in which a bidirectional radio communication is provided in the access monitoring/control system.

11. The method according to claim 7, in which bidirectional radio communication takes place in such a way that on the forward path and the return path of the radio communication are implemented by means of different transmission channels.

12. The method according to claim 2, in which the predefined frequency range depends on the channel spacing.

13. A system for allocating a transmission signal to a transmission channel having a transmission bandwidth and a nominal center frequency, comprising:
   a radio transmitter configured to emit the transmission signal with an actual transmission frequency;
   a radio receiver configured to:
      receive the transmission signal transmitted by the radio transmitter;
      determine the frequency of the transmission signal;
      determine whether the frequency determined by the radio receiver is in a predefined frequency range;
      wherein the radio transmitter has a first maximum tolerance of actual transmission frequency with respect to the nominal center frequency of the transmission channel, and the radio receiver has a second maximum tolerance with respect to the nominal center Frequency of the transmission channel,
      wherein predefined frequency range on the transmission bandwidth of the transmission channel, the first maximum tolerance associated with the radio transmitter, and the second maximum tolerance associated with the radio receiver,
      decide on the allocation of the transmission signal to the one transmission channel if the frequency determined by the radio receiver is determined to be in the predefined frequency range, wherein the allocation of the transmission signal to the transmission channel takes place when a passage difference between the radio transmitter and the radio receiver is not greater than the sum of the first maximum tolerance associated with the radio transmitter and the second maximum tolerance associated with the radio receiver.

14. A radio receiver configured for allocating a transmission signal to a transmission channel having a transmission bandwidth and a nominal center frequency, the radio receiver comprising logic instructions embodied in non-transitory computer-readable media and executable to:
   receive a transmission signal transmitted by a radio transmitter at an actual transmission frequency;
   determine the frequency of the transmission signal;
   determine whether the frequency determined by the radio receiver is in a predefined frequency range;
   wherein the radio transmitter has a first maximum tolerance of actual transmission frequency with respect to the nominal center frequency of the transmission channel, and the radio receiver has a second maximum tolerance with respect to the nominal center frequency of the transmission channel,
   wherein the predefined frequency range depends on the transmission bandwidth of the transmission channel, the first maximum tolerance associated with the radio transmitter, and the second maximum tolerance associated with the radio receiver,
   decide on the allocation of the transmission signal to the one transmission channel if the frequency determined by the radio receiver is determined to be in the predefined frequency range, wherein the allocation of the transmission signal to the transmission channel takes place when a passage difference between the radio transmitter and the radio receiver is not greater than the sum of the first maximum tolerance associated with the radio transmitter and the second maximum tolerance associated with the radio receiver.

15. A method for allocating transmission channels in a network including a plurality of radio transmitters which transmit transmission signals and radio receivers which receive transmission signals, comprising:
   determining a channel spacing between first and second adjacent transmission channels of a plurality of transmission channels by:
      determining a first maximum transmission frequency tolerance corresponding to a maximum frequency tolerance of one or more transmitters associated with the first transmission channel,
      determining a second maximum transmission frequency tolerance corresponding to a maximum frequency tolerance of one or more transmitters associated with the second transmission channel,
      determining a first maximum receiving frequency tolerance corresponding to a maximum frequency tolerance of one or more receivers associated with the first transmission channel,
      determining a second maximum receiving frequency tolerance corresponding to a maximum frequency tolerance of one or more receivers associated with the second transmission channel, and
      calculating a channel separation value based on (a) the sum of the first maximum transmission frequency tolerance and the second maximum transmission frequency tolerance and (b) the larger of the (i) the first maximum receiving frequency tolerance and (ii) the second maximum receiving frequency tolerance, and
   allocating the first and second adjacent transmission channels such that:
      a separation between respective nominal center frequencies of the first and second adjacent transmission channels is at least as large as the determined channel separation value, and
      the first and second adjacent transmission channels partially overlap each other.

16. The method of claim 15, wherein the calculating step comprises calculating a channel separation value based on (a) the sum of the first maximum transmission frequency tolerance and the second maximum transmission frequency tolerance and (b) two times the larger of the (i) the first maximum receiving frequency tolerance and (ii) the second maximum receiving frequency tolerance.

* * * * *